W. PEACOCK.
MACHINE FOR MAKING HORSESHOES.
APPLICATION FILED JULY 6, 1908.
960,390.
Patented June 7, 1910.
2 SHEETS—SHEET 2.
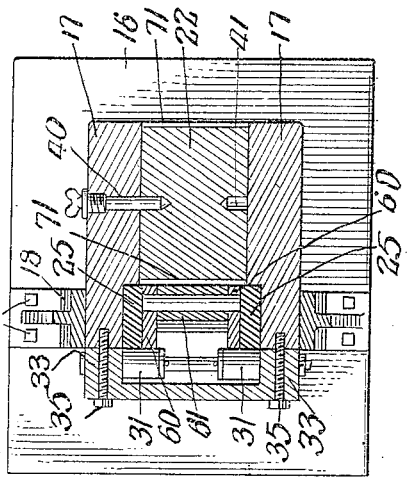
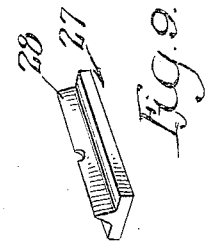
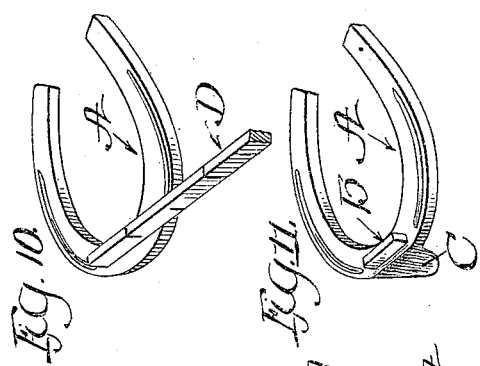
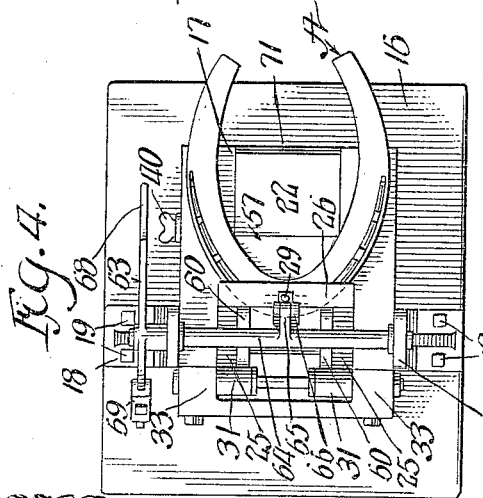
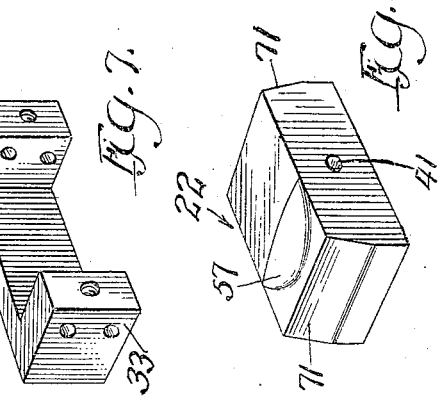
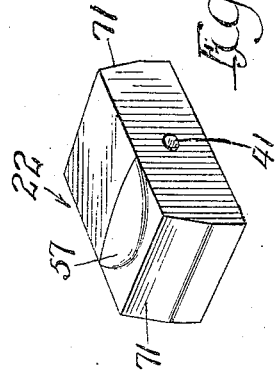
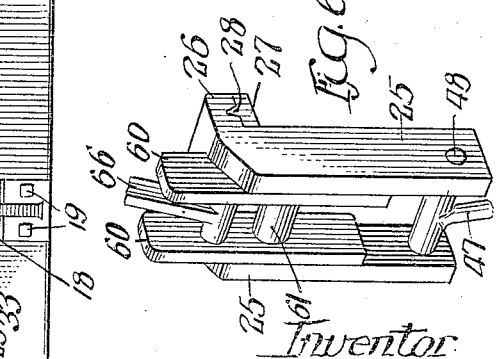
Witnesses:
Inventor:
William Peacock
by Poole & Brown
Attys

UNITED STATES PATENT OFFICE.

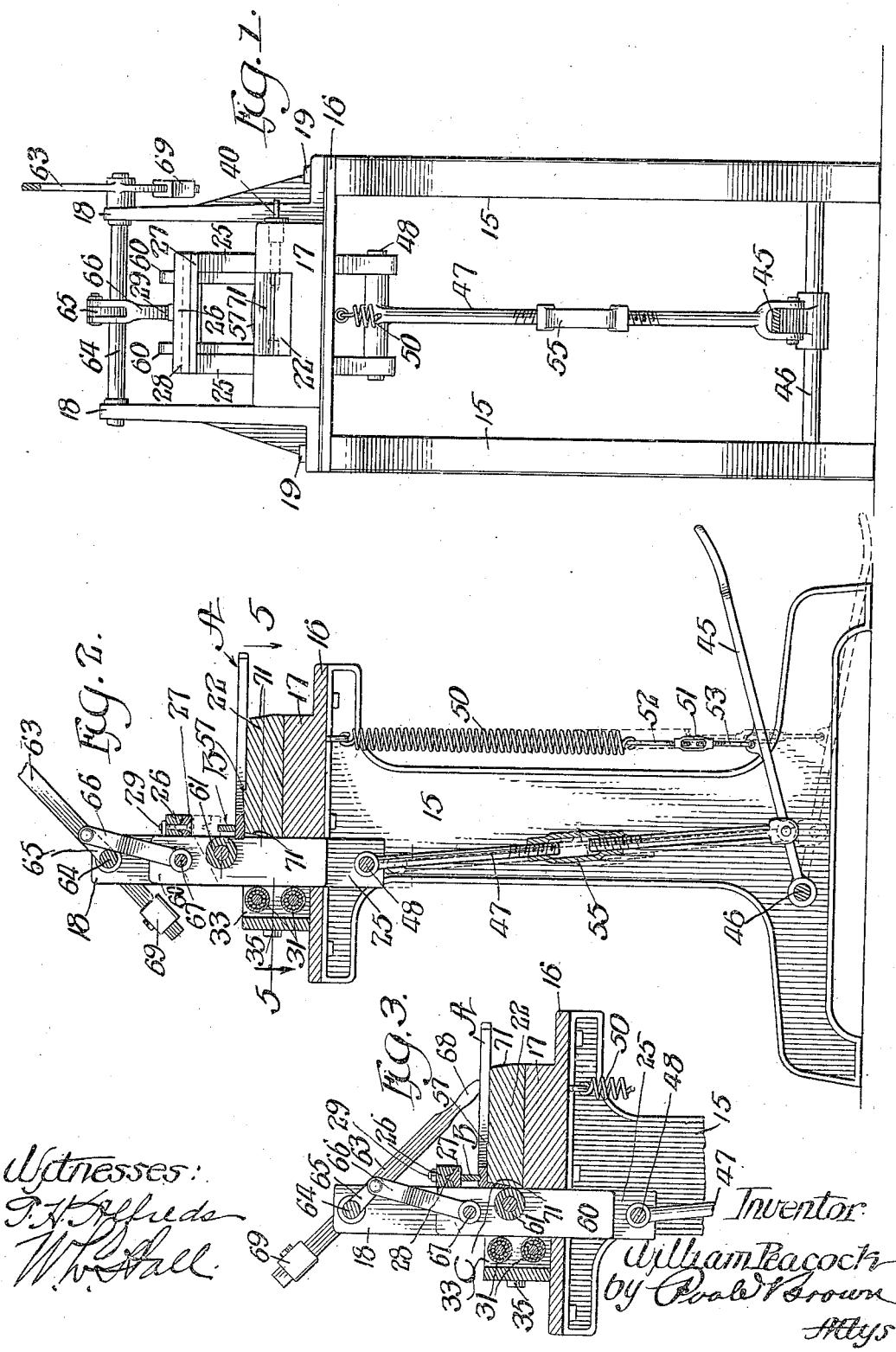

WILLIAM PEACOCK, OF CHICAGO, ILLINOIS.

MACHINE FOR MAKING HORSESHOES.

960,390.  Specification of Letters Patent.  Patented June 7, 1910.

Application filed July 6, 1908. Serial No. 442,103.

*To all whom it may concern:*

Be it known that I, WILLIAM PEACOCK, a citizen of the United States, and a resident of Chicago, in the county of Cook and State of Illinois, have invented certain new and useful Improvements in Machines for Making Horseshoes; and I do hereby declare that the following is a full, clear, and exact description thereof, reference being had to the accompanying drawings and to the letters of reference marked thereon, which form a part of this specification.

This invention relates to a machine for welding calks to horse shoes and for forming toe clips thereon, and the invention consists in the matters hereinafter set forth and more particularly pointed out in the appended claims.

As shown in the drawings: Figure 1 is a front elevation, with parts shown in section, of the machine embodying my invention. Fig. 2 is a transverse vertical section thereof. Fig. 3 is a similar view of the upper part of the machine with parts thereof shown in changed positions. Fig. 4 is a plan view of the machine. Fig. 5 is a horizontal section taken on line 5—5 of Fig. 2. Fig. 6 is a perspective view of the slides which carry the welding hammer and the clip forming roller. Fig. 7 is a perspective view of a guide roller carrying frame which guides the hammer and roller slides. Fig. 8 is a perspective view of the anvil. Fig. 9 is a perspective view of a removable welding hammer face. Fig. 10 is a perspective view illustrating the manner of applying a calk to a horse shoe. Fig. 11 is a perspective view of a finished horse shoe.

As shown in the drawings, 15, 15 designate the two side legs of the machine, and 16 designates a bed plate bolted to the upper ends of the legs and provided with a thickened or raised portion 17. 18, 18 designate two standards rising from said bed plate, one at each side of the thickened part thereof and attached by bolts 19 to the bed plate. Said bolts 19 also fix the bed plate to the supporting legs 15, as herein shown.

22 designates an anvil supported on the thickened or raised portion 17 of said bed plate upon which the horse shoe A is laid and suppported when the calk B is being welded thereto and the toe clip C is being formed thereon. The anvil is located in a recess or depressed portion of the bed plate.

25, 25 designate reciprocating slides which extend through a vertical opening in the bed plate and carry at their upper ends a transverse welding hammer 26 which, as herein shown, is formed integral with the slides. Said hammer overhangs or extends forwardly beyond said slides. As herein shown, the welding hammer carries a detachable face plate 27. Said welding face plate is herein shown as provided on its upper face with a tapered rib 28 which fits within an inverted V-shaped groove on the under side of the welding hammer. Said face plate is attached to the welding hammer by a bolt 29. The said hammer slides are guided between the thickened or raised portion of the bed plate and antifriction rollers 31, 31 which are mounted on transverse horizontal shafts extending between and attached at their ends to lateral arms 33, 33 of a horizontal U-shaped frame piece that is detachably fixed to the raised or thickened portion of the bed plate by screwbolts 35.

The anvil 22 is attached to the bed plate by means of a pin 40 adapted to enter one of two openings 41 at the sides of the anvil. Said pin is screw-threaded and extends laterally through the bed plate at one side of the anvil recess and extends into one or the other of the similar openings 41, depending upon the endwise adjustment of the anvil.

In applying and welding a calk to a horse shoe by means of said machine, the shoe is first laid upon the anvil, after being heated to the proper welding temperature and the calk is applied thereto. In accordance with convenient practice the calks are cut from a bar D, as shown in Fig. 10, they being only partially cut from the bar before being applied to the shoe, whereby the calks may be readily applied by the use of the bar as a handle. When the calk, heated to a proper welding heat and is placed on the upper face of the inverted shoe, as shown in Fig. 2, it lies directly under the welding hammer and is thereafter welded to the shoe by pressure of the hammer when the latter is depressed. Power to depress the hammer may be applied from any suitable source, which may be hand or foot power, or may be motor power. As herein shown, the said welding hammer is depressed to press the calk into welding engagement with the shoe through the medium of a treadle bar 45 located in the lower part of the machine and pivoted to a transverse horizontal rod 46 which is mounted in the lower ends of the legs 15. The said treadle bar is connected, through the medium of a link 47, with the lower ends of the hammer slides; the link being herein shown as pivoted at its upper end to a cross rod 48 which extends between and is mounted in apertures in the lower ends of the welding hammer slides. A spiral contractile spring 50, attached at its lower end to the treadle bar and at its upper end to the bed plate of the machine, serves to retract said treadle bar and to raise the slides and welding hammer carried thereby, when foot pressure is released from said treadle bar. An adjusting device is provided for said spring, consisting, as herein shown, of a right and left hand threaded nut 51 which is screw-threaded to short rods 52, 53 connected one with the spring and the other with the treadle bar. The link 47 connecting the treadle bar with the welding hammer slides is likewise adjustable, by means of a right and left hand threaded nut 55 which has screw-threaded engagement with the adjacent ends of the two rods forming said link.

The detachable hammer face shown in Fig. 7 is formed with a flat lower working face adapted for welding a flat faced calk to a shoe. If it be desired to weld a sharp calk to a shoe, the hammer is removed from the hammer head, in order to permit the inverted V-shaped groove to engage the sharpened calk, to provide proper engagement of the calk with the hammer head to press the calk into welding engagement with the shoe. The said anvil is provided on its upper face, at one end thereof, with a protuberance 57 which is adapted to engage the concave upper face of the inverted shoe when the shoe is laid on the anvil, and to thus support the shoe solidly throughout the width of its front or transverse portion. Said supporting protuberance is used when applying a calk to a front shoe which is formed at its upper face to provide a concave, as is well known in the art. The hind shoe, however, is not formed with such transversely concave contour, and the upper face of the anvil opposite the protuberance 57 is flat. It will be understood, of course, that the anvil, being removable, may be reversed end to end when operating on shoes of the different kinds referred to.

The clip C is formed on the front or closed part of the shoe by turning the front marginal part of the closed or transverse portion of the shoe downwardly, and this is effected by a rolling operation, the mechanism for which will now be described.

60, 60 designate two laterally separated slides which engage the inner sides of the hammer slides 25 and extend through the vertical opening in the bed plate and are vertically reciprocable between the thickened portion of the bed plate and the guide rollers 31.

61 designates a roller which is mounted horizontally between said slides on a horizontal shaft or rod which is affixed at its end in the slides, said roller thus serving to hold the slides laterally separated. Said roller slides are reciprocated through the medium of a hand-lever 63 which is fixed to one end of a rock shaft 64 that extends between and is mounted at its ends in the upper ends of the standards 18. The said rock shaft is provided between its ends with a crank arm 65 which is pivotally connected at its end with the upper end of a link 66, and said link is pivotally connected at its lower end with a cross rod 67 extending between and attached at its ends to the upper ends of the roller slides. The said lever is provided at one end with a hand grip 68 by which the lever is swung downwardly to depress the roller, as shown in Fig. 3; and is provided at its other end with a counterbalance weight 69, which normally holds the lever in its uppermost position with the roller and slides which carry the same raised.

The anvil is provided at its end with inclined die faces 71, 71 each of which is adapted to face the clip forming roller, and when so facing the roller is located a distance in front of the latter. When a clip is to be formed on the toe of the shoe, the shoe is placed with its toe slightly projecting beyond the flat upper face of the die and overhanging the inclined end die face 71 thereof. The shoe is thus placed at a time when the roller is in its upper position, as shown in Fig. 2. After the shoe is thus placed the hand lever 63 is swung downwardly, thereby carrying the roller downwardly against the toe of the shoe and rolling the metal of the toe downwardly between the roller and the adjacent inclined die face of the anvil to form the clip C as shown in Fig. 3.

When the machine is operated as a combined calk welding and clip forming machine, the calk is first welded to the shoe in the manner hereinbefore described, by depressing the treadle bar 45, and the welding hammer is held down on the calk while the hand lever of the clip rolling mechanism is depressed, thus holding the shoe firmly in place during the formation of the clip. Thus there is presented an important advantage in the use of a machine having the double function of welding the calk by pressure and forming a clip thereon, inasmuch as the calk welding means constitutes means for holding the shoe firmly in place while the toe clip is formed or rolled. Moreover, the position of the shoe need not be changed when performing the two operations. Time is thus saved. It will be observed that the welding hammer slides and the roller slides are free to reciprocate independently of each other, thereby permitting such alternate action as desired. The said anvil 22 is provided at both ends with the inclined clip forming die faces in order that the clip may be formed on either a front or a rear shoe at the time a calk is being welded thereto.

It may be observed that the machine, or the parts therefor, may be operated to perform either of the functions separately, and furthermore that the details of the construction of the machine may be considerably varied within the scope of my invention. I do not wish to be limited to such details, therefore, except as may hereinafter be made the subject of specific claims.

I claim as my invention:—

1. A machine for the purpose set forth comprising in combination, a bed plate, an anvil thereon, a reciprocating hammer over the anvil for welding a calk on a shoe supported on the upper face of said anvil, reciprocable slides movable independently of hammer, said anvil being formed on its for forming a toe clip on a horse shoe supported on said anvil, means for operating said hammer, and means for operating said reciprocable slides independently of said hammer.

2. A machine for the purpose set forth comprising in combination, a bed plate provided with a vertical guide opening, an anvil supported on the bed plate, slides reciprocable in said guide opening, a welding hammer carried by the upper ends of said slides and movable toward and from the anvil, slides carrying a clip forming roller and located between the welding hammer slides and having guiding engagement with said hammer slides and the bed plate, manually operable means for reciprocating said hammer slides, and manually operable means for reciprocating said clip roller slides independently of said hammer slides.

3. A machine for the purpose set forth comprising, in combination, a bed plate, an anvil removably fixed thereto and arranged to be reversed end to end, a pressure welding hammer located over and movable toward and from the front end of the anvil for welding a calk on a shoe supported on the anvil, a clip forming device located in front of the anvil and vertically movable with respect thereto and independently of the hammer, said anvil being formed on its upper face at one end to provide a protuberance to interfit and support a concave horse shoe, and at its other end with a flat upper face, and the anvil being provided on both ends with inclined clip forming face.

In testimony, that I claim the foregoing as my invention I affix my signature in the presence of two witnesses, this 25th day of June, A. D. 1908.

WILLIAM PEACOCK.

Witnesses:
 WILLIAM L. HALL,
 GEORGE R. WILKINS.